(12) United States Patent
Stapleton

(10) Patent No.: US 11,552,804 B1
(45) Date of Patent: Jan. 10, 2023

(54) CODE SIGN WHITE LISTING (CSWL)

(71) Applicant: Wells Fargo Bank, N.A., San Francisco, CA (US)

(72) Inventor: Jeff J. Stapleton, Arlington, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 211 days.

(21) Appl. No.: 16/932,428

(22) Filed: Jul. 17, 2020

Related U.S. Application Data

(63) Continuation of application No. 16/863,600, filed on Apr. 30, 2020, now Pat. No. 11,431,510.

(51) Int. Cl.
| | | |
|---|---|---|
| *H04L 29/06* | (2006.01) | |
| *H04L 9/32* | (2006.01) | |
| *H04L 9/00* | (2022.01) | |

(52) U.S. Cl.
CPC .......... *H04L 9/3265* (2013.01); *H04L 9/3242* (2013.01); *H04L 9/3247* (2013.01); *H04L 9/3268* (2013.01); *H04L 9/50* (2022.05)

(58) Field of Classification Search
CPC ... H04L 9/3265; H04L 9/3242; H04L 9/3247; H04L 9/3268; H04L 2209/38
See application file for complete search history.

(56) References Cited

U.S. PATENT DOCUMENTS

| | | | | |
|---|---|---|---|---|
| 8,572,368 B1 | | 10/2013 | Deacon | |
| 8,589,691 B1 | * | 11/2013 | Hackborn | H04L 9/3263 |
| | | | | 713/176 |
| 9,338,012 B1 | * | 5/2016 | Naik | H04L 9/3247 |
| 9,575,768 B1 | * | 2/2017 | Kim | G06F 9/4401 |
| 10,135,808 B1 | * | 11/2018 | Wasiq | H04L 63/1408 |
| 10,805,087 B1 | * | 10/2020 | Allen | G06F 21/57 |
| 2003/0078880 A1 | * | 4/2003 | Alley | G06F 21/645 |
| | | | | 705/38 |
| 2004/0162989 A1 | * | 8/2004 | Kirovski | G06F 21/64 |
| | | | | 713/189 |
| 2004/0193872 A1 | * | 9/2004 | Saarepera | G06Q 20/38215 |
| | | | | 713/156 |
| 2010/0058317 A1 | * | 3/2010 | Braams | G06F 21/572 |
| | | | | 717/171 |
| 2010/0185845 A1 | * | 7/2010 | Takayama | G06F 21/575 |
| | | | | 713/189 |

(Continued)

FOREIGN PATENT DOCUMENTS

| | | | | |
|---|---|---|---|---|
| EP | 1320795 B1 | * 11/2005 | ............ | G06F 21/10 |
| WO | WO-2010054369 A1 | * 5/2010 | ............ | G06F 21/10 |

*Primary Examiner* — Sher A Khan
(74) *Attorney, Agent, or Firm* — Foley & Lardner LLP

(57) ABSTRACT

A system and method for efficiently managing an executable environment involving multiple code-sign certificate chains. The system and method include receiving, by one or more processors and from a client device, a request for information to verify an authorization of a code bundle, the code bundle associated with a first signed code segment and a second signed code segment. The system and method include generating, by one or more processors, a list of certificates associated with the code bundle. The system and method include transmitting, by the one or more processors and to the client device, a message comprising the list of certificates, the message causing the client device to verify the code bundle based on the list of certificates.

18 Claims, 8 Drawing Sheets

(56) References Cited

U.S. PATENT DOCUMENTS

| | | | |
|---|---|---|---|
| 2010/0223469 A1* | 9/2010 | Hussain | G06F 21/64 |
| | | | 713/175 |
| 2011/0258426 A1* | 10/2011 | Mujtaba | G06F 21/572 |
| | | | 713/168 |
| 2016/0352521 A1* | 12/2016 | Choi | H04L 9/3247 |
| 2016/0365981 A1* | 12/2016 | Medvinsky | G06F 21/57 |
| 2016/0365983 A1* | 12/2016 | Shahabuddin | G06F 21/645 |
| 2018/0131521 A1* | 5/2018 | Yang | H04L 9/3265 |
| 2019/0156029 A1* | 5/2019 | Ashey | H04L 63/1466 |
| 2019/0372786 A1 | 12/2019 | Ra et al. | |
| 2019/0384586 A1* | 12/2019 | Jiang | G06F 8/65 |
| 2020/0177397 A1* | 6/2020 | Harrington | H04L 9/3297 |
| 2021/0014068 A1* | 1/2021 | Sandler | G06F 21/606 |

\* cited by examiner

700

receiving, by one or more processors and from a client device, a request for information to verify an authorization of a code bundle, the code bundle associated with a first signed code segment and a second signed code segment
702 generating, by one or more processors, a list of certificates associated with the code bundle
704 transmitting, by the one or more processors and to the client device, a message comprising the list of certificates, the message causes the client device to verify the code bundle based on the list of certificates
706

```
transmitting, by a client device and to one or more
processor, a request for information to verify an
authorization of a code bundle comprising a first
signed code segment and a second signed code
segment, the request causing the one or more
processors to generate a list of certificates
associated with the code item
802
```

```
receiving, by the client device and from the one or
more processors, a message comprising the list of
certificates
804
```

```
verifying the code bundle based on the list of
certificates
806
```

FIG. 8

CODE SIGN WHITE LISTING (CSWL)

CROSS-REFERENCE TO RELATED APPLICATIONS

This application is a continuation of U.S. application Ser. No. 16/863,600, filed Apr. 30, 2020, incorporated herein by reference in its entirety

BACKGROUND

Code-Signing is the process of digitally signing executable and scripts to confirm the software author and guarantee that the code has not been altered or corrupted since it was signed. That is, the software (sometimes referred to as, "computer code") is digitally signed using an asymmetric private key and the code signature is verified using the corresponding asymmetric public key encapsulated within a code-sign certificate (also referred to as "a digital certificate", "a public key certificate" or "an identity certificate"), which is an electronic document used to prove the ownership of a public key.

SUMMARY

Aspects of the present disclosure relate generally to code-signing technology in the field of cryptography, and more particularly to systems and methods for efficiently managing an executable environment involving multiple code-sign certificate chains.

One aspect disclosed herein is directed to a method for efficiently managing an executable environment involving multiple code-sign certificate chains. In some arrangements, the method includes receiving, by one or more processors (e.g., CSMS 504 in FIG. 5) and from a client device, a request for information to verify an authorization of a code bundle, the code bundle associated with a first signed code segment and a second signed code segment. In some arrangements, the method includes generating, by one or more processors, a list of certificates associated with the code bundle. In some arrangements, the method includes transmitting, by the one or more processors and to the client device, a message comprising the list of certificates, the message causing the client device to verify the code bundle based on the list of certificates.

In another aspect, the present disclosure is directed to a system for efficiently managing an executable environment involving multiple code-sign certificate chains. In some arrangements, the system includes one or more processors; and one or more computer-readable storage mediums storing instructions which, when executed by the one or more processors, cause the one or more processors to receive, from a client device, a request for information to verify an authorization of a code bundle, the code bundle associated with a first signed code segment and a second signed code segment. In some arrangements, the system includes one or more processors and one or more computer-readable storage mediums storing instructions which, when executed by the one or more processors, cause the one or more processors to generate a list of certificates associated with the code bundle. In some arrangements, the system includes one or more processors and one or more computer-readable storage mediums storing instructions which, when executed by the one or more processors, cause the one or more processors to transmit, to the client device, a message comprising the list of certificates, the message causing the client device to verify the code bundle based on the list of certificates.

In another aspect, the present disclosure is directed to a non-transitory computer-readable storage medium storing instructions which, when executed by one or more processors, cause the one or more processors to perform operations including receiving, by one or more processors and from a client device, a request for information to verify an authorization of a code bundle, the code bundle associated with a first signed code segment and a second signed code segment. In some arrangements, the non-transitory computer-readable storage medium storing instructions which, when executed by one or more processors, cause the one or more processors to perform operations including generating, by one or more processors, a list of certificates associated with the code bundle. In some arrangements, the non-transitory computer-readable storage medium storing instructions which, when executed by one or more processors, cause the one or more processors to perform operations transmitting, by the one or more processors and to the client device, a message comprising the list of certificates, the message causing the client device to verify the code bundle based on the list of certificates.

In another aspect, the present disclosure is directed to a method for efficiently managing an executable environment involving multiple code-sign certificate chains. In some arrangements, the method includes transmitting, by a client device and to one or more processor, a request for information to verify an authorization of a code bundle comprising a first signed code segment and a second signed code segment, the request causing the one or more processors to generate a list of certificates associated with the code bundle. In some arrangements, the method includes receiving, by the client device and from the one or more processors, a message comprising the list of certificates. In some arrangements, the method includes verifying the code bundle based on the list of certificates.

These and other features, together with the organization and manner of operation thereof, will become apparent from the following detailed description when taken in conjunction with the accompanying drawings.

BRIEF DESCRIPTION OF THE FIGURES

FIG. 7 is a flow diagram depicting a method for efficiently managing an executable environment involving multiple code-sign certificate chains, according to some arrangements.

FIG. 8 is a flow diagram depicting a method for efficiently managing an executable environment involving multiple code-sign certificate chains, according to some arrangements.

Like reference numbers and designations in the various drawings indicate like elements.

DETAILED DESCRIPTION

Code-Signing is the process of digitally signing executable and scripts to confirm the software author and guarantee that the code has not been altered or corrupted since it was signed. That is, the software (sometimes referred to as, "computer code") is digitally signed using an asymmetric private key and the code signature is verified using the corresponding asymmetric public key encapsulated within a code-sign certificate (also referred to as "a digital certificate", "a public key certificate" or "an identity certificate"), which is an electronic document used to prove the ownership of a public key.

Figure 1:
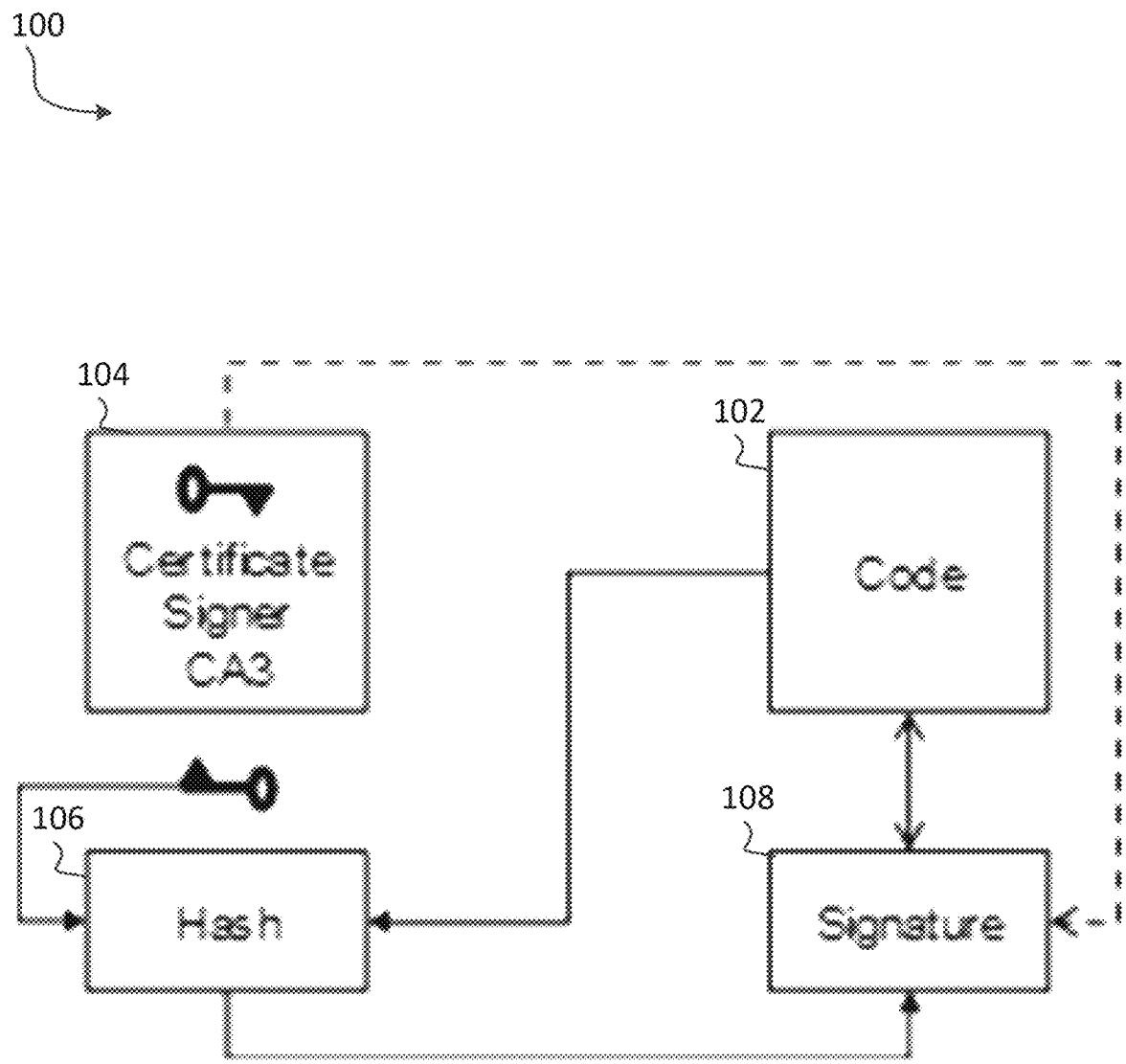
FIG. 1 is a block diagram depicting an example environment for digitally signing code, according to a conventional arrangement.

For example, FIG. 1 is a block diagram depicting an example environment 100 for digitally signing code, according to a conventional arrangement. To sign the code 102, the developer generates a public/private key pair and provides the public key and the developer's identity information to a trustworthy certificate authority (CA). The CA 104 (shown in FIG. 1 as, "Certificate Signer CA3 104") verifies the authenticity of the developer's identity information and then issues, to the developer, a code-sign certificate (e.g., an X.509 certificate) that the CA 104 signs using the CA's 104 private key. The code-sign certificate contains the developer's identity and the developer's public key. To establish authorship, the developer signs the code 102 by hashing the code 102 to create a hash value 106 and encrypting the hash value 106 using the developer's private key to create a digital signature 108, which the developer then attaches (e.g., appends, links, embeds, etc.) to the code 102. These operations generally constitute the code signing process.

The public key of the CA 104 is already pre-installed in the trust stores of most browsers and/or operating systems such that when a "relying party" (e.g., client device) downloads the software, the browser and/or operating system of the client device fetches (from its local storage) the CA's 104 public key to first verify the authenticity of the code signing certificate that is sent with or embedded in the signed software to confirm that the software is from a trustworthy CA, or in this instance, from the CA 104. After verifying the authenticity of the code signing certificate, the client device extracts the developer's public key from the code-sign certificate and uses it to decrypt the digital signature 108 to recover the hash value 106 of the code 102. The client device then hashes the code that it receives from the developer to create a hash value, and compares the hash value to the recovered hash value 106. If the hash values match, then the user of the client device is notified that the software is as the developer last left it, and (if the developer is to be trusted) is safe to install and/or run.

Figure 2:
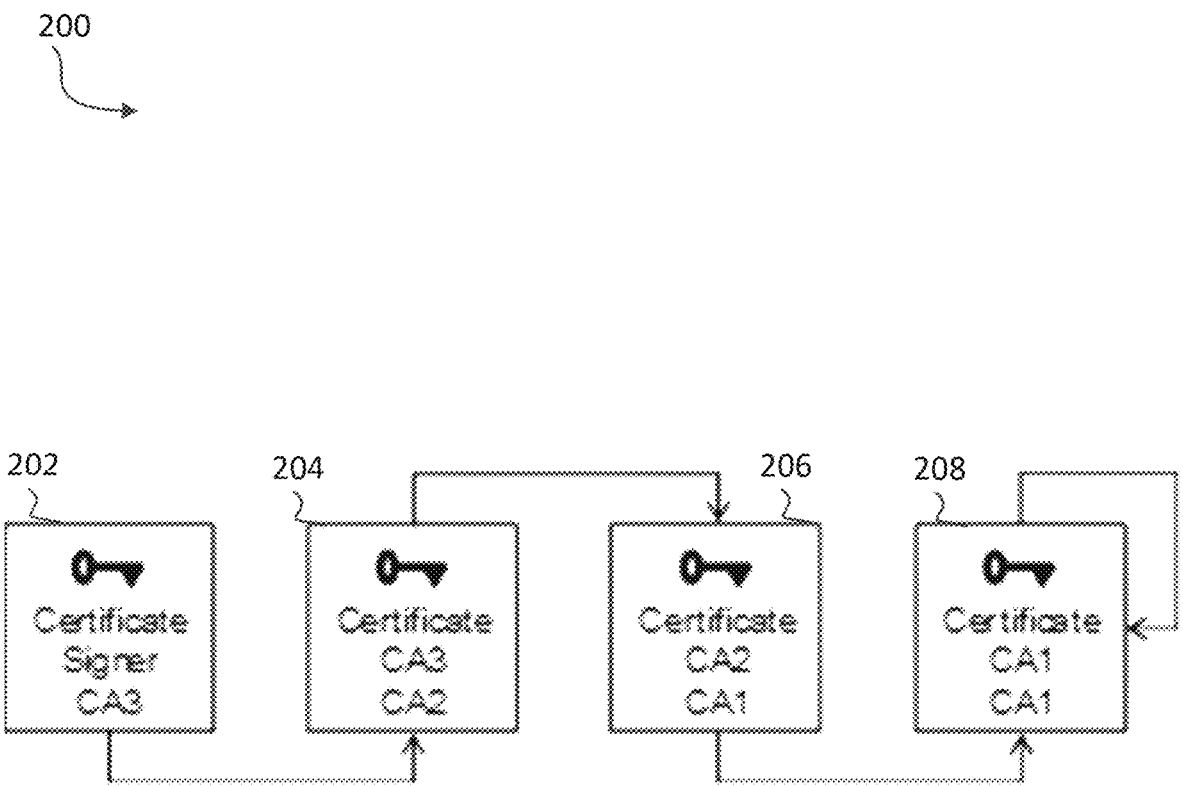
FIG. 2 is a block diagram depicting an example environment 200 of a code-sign certificate chain, according to a conventional arrangement.

The code-signing process may create a code-sign certificate chain. For example, FIG. 2 is a block diagram depicting an example environment 200 of a code-sign certificate chain, according to a conventional arrangement. The code-sign certificate is issued from a trusted CA 202 where the code-sign certificate is signed by the issuing CA 204 and verified using the issuing CA's 204 public key. The issuing CA's 204 public key is published in another X.509 certificate typically signed by an intermediate CA 206 and verified using the intermediate CA's 206 public key. The intermediate CA's 206 public key is published in another X.509 certificate typically signed by a root CA 208 and verified using the root CA's 208 public key. The root CA's 208 public key is published in a trust anchor, such as securely a managed self-signed certificate. The relying party then validates the code-sign certificate chain such that the code-sign certificate public key can be used to verify the signature on the executable software.

Figure 3:
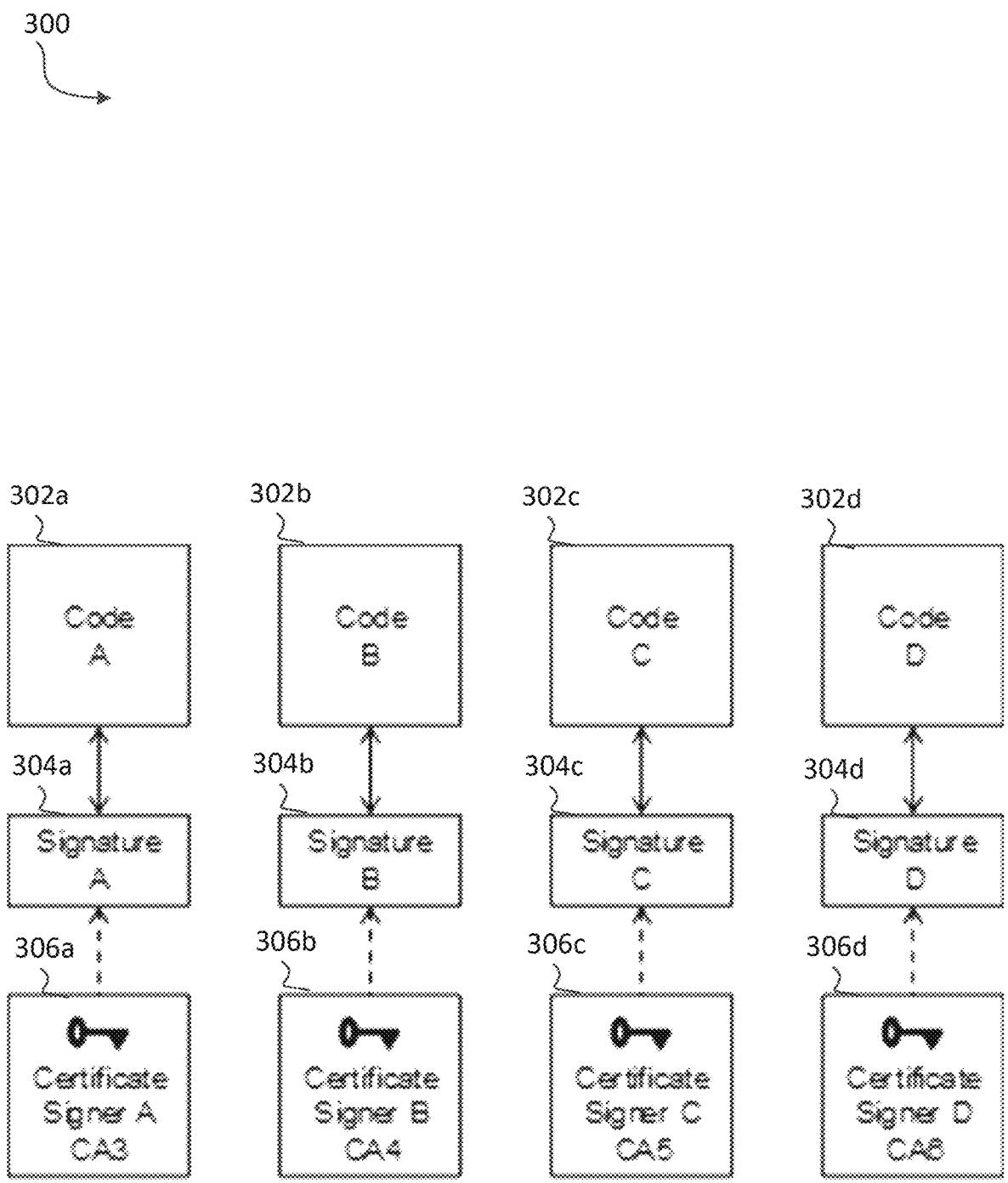
FIG. 3 is a block diagram depicting an example environment 300 of multiple code-signers, according to a conventional arrangement.

However, executable environments often have code from numerous sources creating multiple code-sign certificate chains. As such, many signatures need to be verified using many code-sign certificates issued from many different CA. For example, FIG. 3 is a block diagram depicting an example environment 300 of multiple code-signers, according to a conventional arrangement. The environment 300 includes code 302A (shown in FIG. 3 as, "Code A") from a first developer, code 302B (shown in FIG. 3 as, "Code B") from a second developer, code 302C (shown in FIG. 3 as, "Code C") from a third developer, and code 302D (shown in FIG. 3 as, "Code D") from a fourth developer. In some arrangements, the code 302A, the code 302B, and/or the code 302C may each be referred to herein as, "a code segment". In some arrangements, each of the code 302A, the code 302B, and/or the code 302C may be referred to herein as a "code bundle". In some arrangements, a "code bundle" may include one or more of the code 302A, the code 302B, and the code 302C.

Each developer signs their respective code based on the code signing process described above with respect to FIG. 1. That is, the first developer generates and attaches a digital signature 304A to code 302A where the public key of the first developer is inserted in the code-sign certificate issued by CA 306A. The second developer generates and attaches a digital signature 304B to code 302B where the public key of the first developer is inserted in the code-sign certificate issued by CA 306B. The third developer generates and attaches a digital signature 304C to code 302C where the public key of the third developer is inserted in the code-sign certificate issued by CA 306C. The fourth developer generates and attaches a digital signature 304D to code 302D where the public key of the fourth developer is inserted in the code-sign certificate issued by CA 306D.

Thus, a relying party performing a certificate validation on a piece of code that consists of code 302A, code 302B, code 302C, and 302D would have the burden of "walking" (e.g., from the code-sign certificate of the end-entity to the code-sign certificate of the beginning-entity) each of the code-sign certificate chains.

Figure 4:
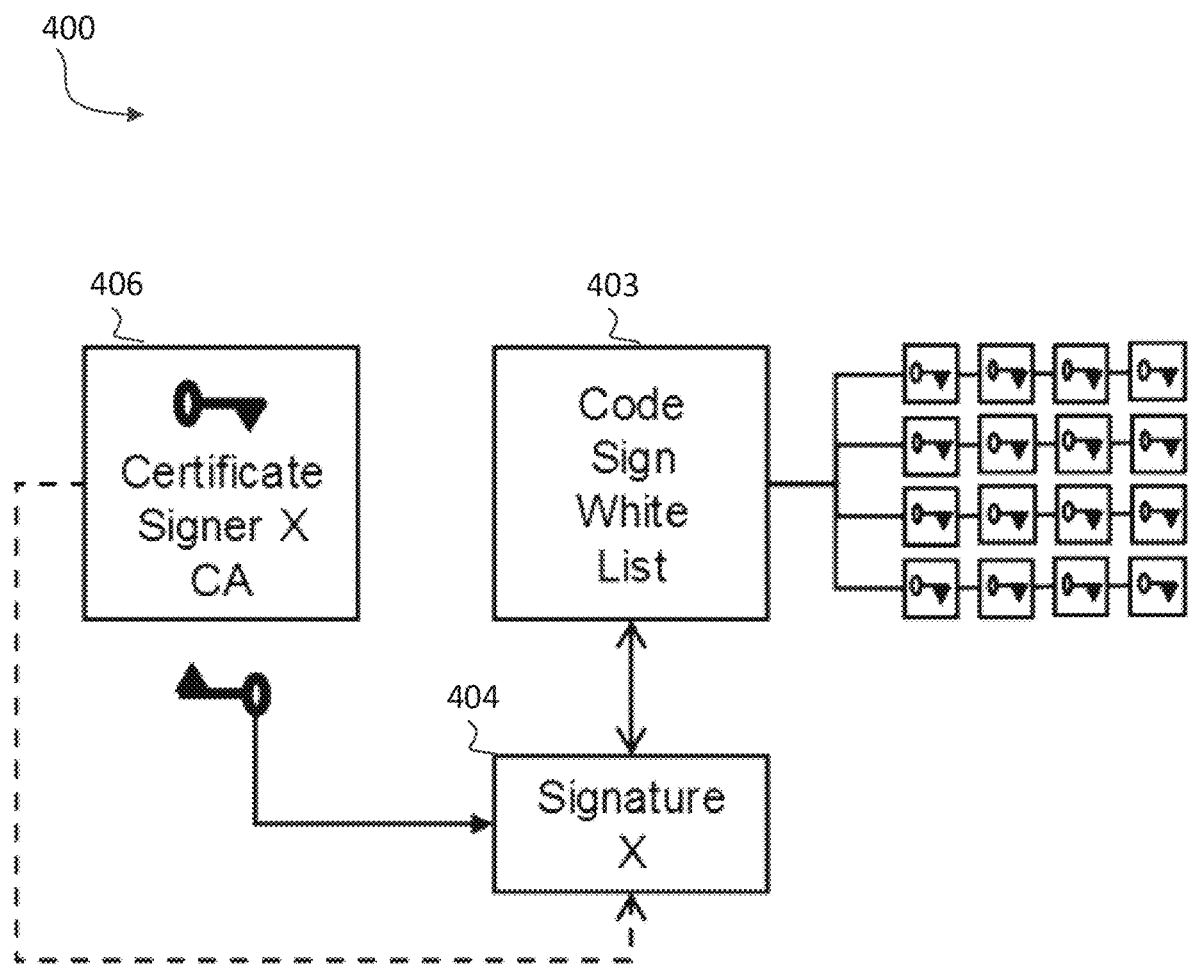
FIG. 4 is a block diagram depicting an example environment of a code-sign whitelist, according to some arrangements.

Accordingly, the present disclosure is directed to systems and methods for efficiently managing an executable environment involving multiple code-sign certificate chains. For example, FIG. 4 is a block diagram depicting an example environment of a code-sign whitelist, according to some arrangements. A relying party (e.g., a client device 112 in FIG. 5) may retrieve a single code-sign white list (CSWL) 403 from a trusted signer (e.g., CMS 502 in FIG. 5) who digitally signs the CSWL 403 with a digital signature 404. The trusted signer also manages the executable environment by updating and maintaining the CSWL 403. The digital signature 404 is verified using the trusted signer's code-sign certificate that is issued from a trusted CA 406. The CSWL 403 is composed of the certificate chains needed to verify any of the code signatures. The certificate chains may be explicitly included in the list or implicitly refer to the certificates using a Uniform Resource Locator (URL) or other methods. As such, the executable environment only needs to manage the certificate chain for the CSWL. In some arrangements, the CSWL may include a timestamp, a version number, a time-to-live (TTL), and/or the next publication date. In some arrangements, the executable environment may download the CSWL 403 periodically or on-demand as needed.

Figure 5:
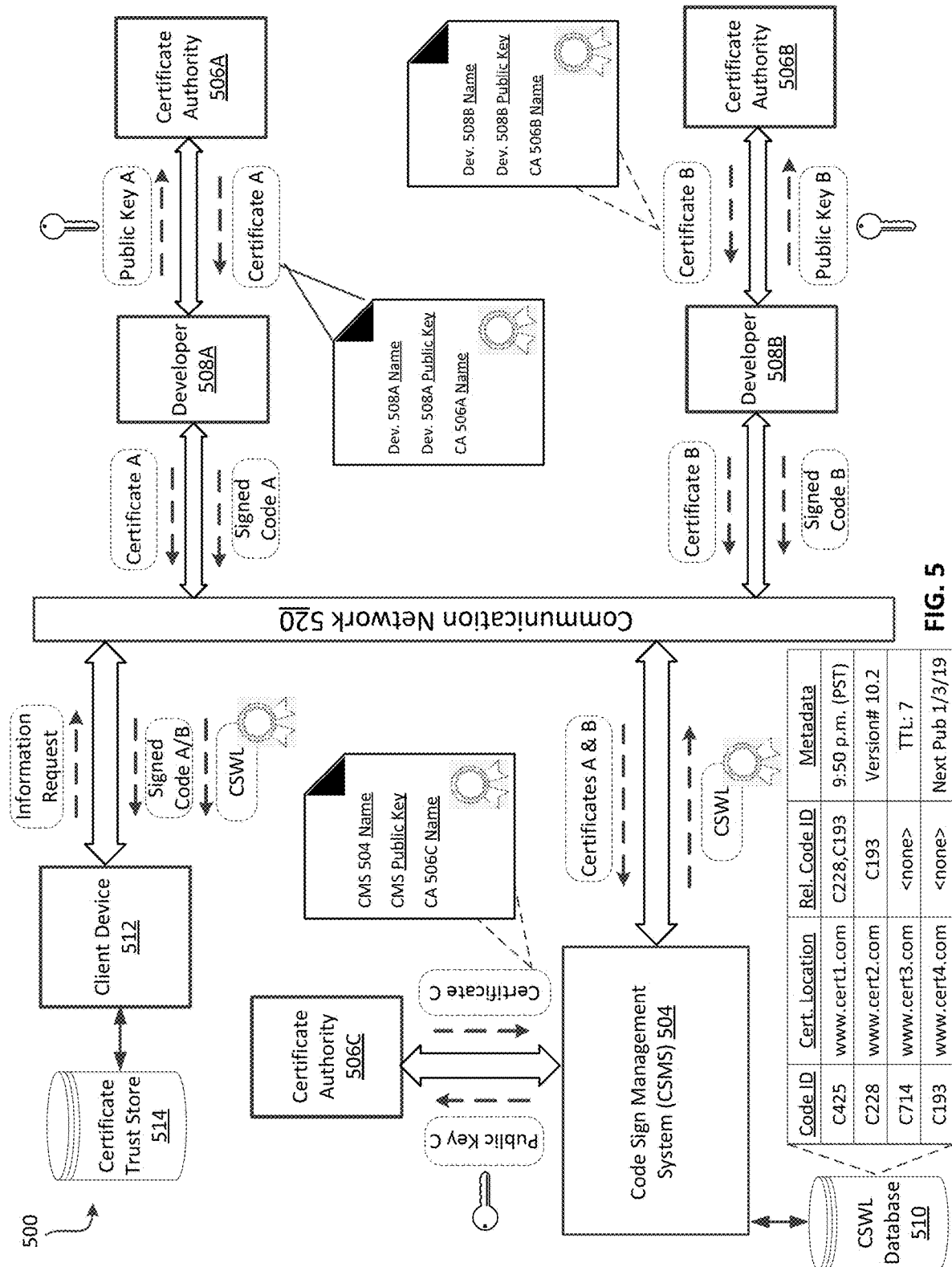
FIG. 5 is a block diagram depicting an example environment of a code-sign whitelist, according to some arrangements.

FIG. 5 is a block diagram depicting an example environment of a code-sign whitelist, according to some arrangements. The environment 500 may include a client device 512 in communication, via a communication network 520, with a code sign management system (CSMS) 504 and one or more software/code developers (e.g., developer 508A and 508B in FIG. 5). The environment 500 may include one or more certificate authorities, such as certificate authority 506A, certificate authority 506B, and certificate authority 506C (collectively referred to herein as, "certificate authorities 506") for generating and providing one or more digital certificates (also referred to herein as, "a code-sign certificate") to the one or more software/code developers, such as developer 508A and developer 508B (collectively referred to herein as, "developers 508") and/or a CSMS 504.

Specifically, the developer 508A may generate a public/private key pair and provide the public key (e.g., "public key A" in FIG. 5) and/or the developer's 508A identity information to a certificate authority 506A. In response, the certificate authority 506A may generate a digital certificate (e.g., "certificate A" in FIG. 5) that includes the public key and/or identifying information (e.g., the developer's 508A identity information, the certificate authority's 506A identity information) and provide the digital certificate to the developer 508A.

The developer 508B may also generate a public/private key pair and provide the public key (e.g., "public key B" in FIG. 5) and/or the developer's 508B identity information to a certificate authority 506B. In response, the certificate authority 506B may generate a digital certificate (e.g., "certificate B" in FIG. 5) that includes the public key and/or identifying information (e.g., the developer's 508B identity information, the certificate authority's 506B identity information) provide the digital certificate to the developer 508B.

The CSMS 504 may also generate a public/private key pair and provide the public key (e.g., "public key C" in FIG. 5) and/or the CSMS 504 identity information to a certificate authority 506C. In response, the certificate authority 506C may generate a digital certificate (e.g., "certificate C" in FIG. 5) that includes the public key and/or identifying information (e.g., the CMS's 504 identity information, the certificate authority's 506C identity information), and provide the digital certificate to the CSMS 504.

The client device 512, the CSMS 504, the certificate authorities 506, and the developers 508 may each include hardware elements, such as one or more processors, logic devices, or circuits. Although FIG. 5 shows only a select number of computing devices (e.g., client devices 512, CSMSs 504, developers 508, and certificate authorities 506), it will be appreciated by those skilled in the art that the environment 500 may include many thousands of computing devices that are interconnected in any arrangement to facilitate the exchange of data (e.g., public keys, digital certificates, etc.) between the computing devices.

A developer 508 may be an organization and/or an individual that generates computer code (e.g., executables, scripts, software, programs, etc.) and sends (or makes available for download) the computer code to a relying party (e.g., a client device 512 and/or a CSMS 504) to allow the relying party to use (e.g., execute, install, run, etc.) the computer code. In some arrangements, the developer may generate computer code (e.g., Code A) that includes the computer code that was generated and authored by another developer. For example, developer 508B may generate computer code (e.g., Code B) and provide (via communication network 520) the computer code to developer 508A. In turn, the developer 508A may generate (e.g., bundle) computer code (e.g., Code A) that includes (e.g., embedded, referenced, etc.) the computer code (e.g., Code B) that the developer 508B generated, such that the computer code may be a "bundled" computer code. The developer 508A may then send the "bundled" computer code (e.g., Code A) to a relying party (e.g., a client device 512 and/or a CSMS 504) to allow the relying party to use (e.g., execute, install, run, etc.) the computer code.

In some arrangements, the computer code (e.g., Code A) that is generated by the developer 508A and/or the computer code (e.g., Code B) that is generated by the developer 508B may each be referred to herein as, "a code segment". In some arrangements, a "code bundle" may include the computer code (e.g., Code A) that is generated by the developer 508A and the computer code (e.g., Code B) that is generated by the developer 508B.

In some arrangements, the computer code (e.g., Code A and/or Code B) that is generated by the developer 508A and/or developer 508B may be a smart contract that is configured to execute on a distributed ledger technology (DLT) or blockchain network. That is, a DLT network (not shown in FIG. 5) may include a plurality of DLT nodes that are interconnected with one another to form a peer-to-peer network. The DLT network, the CSMS 504, the developer 508A, the developer 508B, and the client device 512 may be interconnected with one another via the communication network 520.

In some arrangements, a developer 508 may digitally sign the computer code (or "bundled" computer code) before providing the computer code (in its signed form) to the relying party and/or another developer. For example, the developer 508A may generate computer code (e.g., Code A) and digitally sign the computer code using a private key associated with the developer 508A. As another example, the developer 508B may generate computer code (e.g., Code B) and digitally sign the computer code using a private key associated with the developer 508B.

In some arrangements, a developer 508 may generate a "bundled" computer code that includes the signed (or unsigned) computer code (e.g., Code A) generated by developer 508 and the signed (or unsigned) computer code (e.g., Code B) generated by another developer, and sign the "bundled" computer code before providing the "bundled" computer code (in its signed form) to the relying party and/or another developer. For example, the developer 508B may generate computer code (e.g., Code B) and digitally sign the computer code using a private key associated with the developer 508B. The developer 508A may then send the computer code (e.g., Code B) to developer 508A. The developer 508A may generate computer code (e.g., Code A) and digitally sign the computer code using a private key associated with the developer 508A. The developer 508A may generate a "bundled" computer code that includes (or references) the Code A and/or Code B. The developer 508A may digitally sign the "bundled'" computer code using the private key associated with the developer 508A, and provide the "bundled" computer code to the client device 512 and/or the CSMS 504. As another example, the developer 508A may generate a "bundled" computer code that includes (or references) Code B, and digitally signs the computer code using a private key associated with the developer 508A.

In some arrangements, the developer 508A may digitally sign the computer code by hashing the computer code using a hashing function (e.g., Secure Hash Algorithm 2 (SHA-2), SHA-3, RACE Integrity Primitives Evaluation Message Digest (RPEMD), Whirlpool, etc.) to generate a hash value of the computer code.

In some arrangements, a digital signature may be a cryptographically derived value that may be symmetric (e.g. MAC, HMAC), asymmetric (e.g. RSA, DSA, ECDSA), or a post quantum cryptography (PQC) signature.

In some arrangements, the developer 508 may digitally sign the computer code by generating a digital signature using the private key associated with the developer 508A, and attach (e.g., append, link, adhere, associate) the digital signature to the computer code to generate a signed computer code.

In some arrangements, the developer 508 may send a message to the relying party (e.g., a client device 512 and/or a CSMS 504) that contains the signed computer code (e.g., the digital signature and the computer code). In some arrangements, a developer 508 may send the digital certificate (e.g., the digital certificate containing the developer's 508 public key used to verify the digital signature) to the relying party (e.g., a client device 512 and/or a CSMS 504) in the same message that contains the signed computer code or in a different message.

The communication network 520 is a local area network (LAN), a wide area network (WAN), a personal area network (PAN), or a combination of these or other networks, that interconnect the computing devices (as discussed herein) and/or databases. Although not illustrated, in many arrangements, the communication network 120 may comprise one or more intermediary devices, including gateways, routers, firewalls, switches, network accelerators, Wi-Fi access points or hotspots, or other devices. Any of the computing devices and/or the communication network 120 may be configured to support any application layer protocol, including without limitation, Transport Layer Security (TLS), Hypertext Transfer Protocol (HTTP), File Transfer Protocol (FTP), and Secure Shell (SSH).

A client device 512 may be a computing device that is under the control of a user (or an entity associated with the user) and capable of receiving information (e.g., computer code, signed code, a code-sign white list (CSWL)) and/or sending information (e.g., information request) to/from one or more computing devices (e.g., one or more computing device associated with developers 508 and/or certificate authorities 506, CSMS 504, databases, etc.) over communication network 520.

A client device 512 may be any number of different types of computing devices, including without limitation, a personal computer, a laptop computer, a desktop computer, a mobile computer, a tablet computer, a smart phone, a digital video recorder, a set—top box for a television, a video game console, a digital wallet (sometimes referred to as an "e-Wallet"), or any other type and form of computing device or combinations of devices. In some arrangements, the type of client device 512 may be categorized as a mobile device, a desktop device, a device intended to remain stationary, a device adapted to primarily access a network via a local area network (e.g., communication network 520), or another category of electronic devices such as a media consumption device. The client device 512 may include a user application (e.g., a web browser, an email application, an FTP application, etc.) to facilitate the sending and receiving of data over communication network 520.

A client device 512 may send a request (e.g., information request in FIG. 5) to a developer for a code item, causing the developer to send a signed code item to the client device 512. For example, the client device 512 may send a request (e.g., code request in FIG. 5) to developer 508A for a code item, causing the developer 508A to send a signed code item (e.g., signed code A in FIG. 5) to the client device 512. As another example, the client device 512 may send a request (e.g., code request in FIG. 5) to developer 508B for a code item, causing the developer 508B to send a signed code item (e.g., signed code B in FIG. 5) to the client device 512. In some arrangements, the client device 512 may send a request (e.g., code request in FIG. 5) to developer 508A for one or more code items, causing the developer 508A to send signed code A (that was generated by developer 508A) and signed code item B (that was generated by developer 508B) to the client device 512.

A client device 512 may send a request (e.g., information request in FIG. 5) to the CSMS 504 for a code-sign white listing (CSWL) associated with one or more code items, causing the CSMS 504 to generate and/or retrieve from a database (e.g., CSWL database 510) a CSWL associated with the one or more code items, and send the CSWL to the client device 512. For example, the client device 512 may send a request to CSMS 504 for a CSWL associated with (e.g., included in or referenced in) with a signed code A and a signed code B.

In response to receiving the request, the CSMS 504 may generate a CSWL that includes a digital certificate (e.g., certificate A in FIG. 5) associated with the signed code A and a digital certificate (e.g., certificate B in FIG. 5) with the signed code B and send the CSWL to the client device 512. In some arrangements, the request may cause the CSMS 504 to retrieve a CSWL from a database (e.g., CSWL database 510) that includes the digital certificate (e.g., certificate A in FIG. 5) associated with the signed code A and the digital certificate (e.g., certificate B in FIG. 5) with the signed code B and send the CSWL to the client device 512.

In some arrangements, the request may cause the CSMS 504 to generate a digital signature based on the CSWL using a private or public key, attach (e.g., append, pre-pend, link, associate, embed) the digital signature to the CSWL to generate a digitally signed CSWL, and send the digitally signed CSWL to the client device 512. In some arrangements, the request may cause the CSMS 504 to store the CSWL that it generates in a database (e.g., CSWL database 510). In some arrangements, the client device 512 may send the request (e.g., information request in FIG. 5) to the CSMS 504 for a CSWL on a periodic basis (e.g., hourly, daily, weekly, monthly, etc.) or on an "on-demand" basis (e.g., upon receiving a signed code item from a developer 508). In some arrangements, the request may include one or more identifiers to one or more code items. For example, the request may include a first code identifier (e.g., C425) indicating a first code item and a second code identifier (e.g., C228) indicating a second code item.

In some arrangements, the request may cause the CSMS 504 to generate a digital signature based on the CSWL using a private, without attaching the digital signature to the CSWL. That is, the digital signature is separate from the CSWL and the signed CSWL.

The environment 500 may include a certificate trust store 514 for storing a list of digital certificates (also referred to herein as, "trusted root certificates"). In some arrangements, a client device may use one or more digital certificates stored in the certificate trust store 514 to verify an authentication of a signed CSWL that it receives from the CSMS 504. For example, a client device 512 may send a request (e.g., information request in FIG. 5) to the CSMS 504 for a code-sign white listing (CSWL) associated with one or more code items, causing the CSMS 504 to send a signed CSWL to the client device 512.

The client device 512 (e.g., via an operating system and/or an application executing on the client device 512) may verify whether the signed CSWL is authentic (e.g., generated by the CSMS 504 and unaltered by a third party) by retrieving a digital certificate that is associated with the CSMS 504 from the certificate trust store 514. The client device 512 may extract a public key from the digital certificate and uses the public key to verify the digital signature associated with the signed CSWL to recover a hash value. The client device 512 may hash (via a hash function) the CSWL to generate a second hash value. The client device 512 compares the recovered hash value and the second hash value to determine whether the signed CSWL originates from the CSMS 504 and is unaltered.

In some arrangements, the messages causes the client device to verify a digital signature.

In some arrangements, after the client device 512 determines that the signed CSWL is authentic, the client device 512 may use the one or more digital certificates in the CSWL to verify the authenticity of the one or more code items. In some arrangements, a certificate authority (e.g., certificate authority 506A, 506B, 506C, etc.) may populate the certificate trust store 514 with digital certificates. In some arrangements, the client device may receive one or more digital certificates from one or more certificate authorities (e.g., certificate authority 506A, 506B, 506C, etc.), and populate the certificate trust store 514 with the one or more digital certificates.

In some arrangements, the CSWL include one or more Uniform Resource Locators (URL) that refer to remote locations where the client device 512 may fetch the certificates using the one or more URLs. For example, the client device may receive a signed CSWL from the CSMS 504 that includes a first URL to a first digital certificate and a second URL to a second digital certificate. The client device 512 may fetch the first digital certificate using the first URL and fetch the second digital certificate using the second URL.

The CSMS 504 may be a computing device that is capable of receiving information (e.g., a digital certificate, signed/unsigned computer code, etc.) and/or sending information (e.g., a public key, a CSWL, metadata, signed/unsigned computer code, etc.) to/from one or more computing devices (e.g., a client device 512, other CSMSs 504, a database) over communication network 520. A CSMS 504 may be any number of different types of computing devices, including without limitation, an application server, a catalog server, a communications server, a computing server, a database server, a file server, a game server, a mail server, a media server, a proxy server, a virtual server, a web server, or any other type and form of computing device or combinations of devices.

The CSMS 504 may receive a request (e.g., information request in FIG. 5) from a client device 512 for a code-sign white listing (CSWL) associated with one or more code items. In response, the CSMS 504 may generate a CSWL associated with the one or more code items, and send the CSWL to the client device 512. For example, the CSMS 504 may receive a request from a client device 512 for a CSWL associated (e.g., included in or referenced in) with a signed code A and a signed code B. In response, the CSMS 504 may generate a CSWL that includes a digital certificate (e.g., certificate A in FIG. 5) associated with the signed code A and a digital certificate (e.g., certificate B in FIG. 5) with the signed code B and send the CSWL to the client device 512.

In some arrangements, the CSMS 504 may generate a CSWL that includes one or more digital certificates and one or more metadata (e.g., a timestamp, a version number, a time-to-live (TTL), and/or the next publication date, etc.) associated with the one or more digital certificates. In some arrangements, the CSMS 504 determines to include a digital certificate associated with the signed code A because the request (e.g., information request in FIG. 5) included an identifier to the signed code A.

In some arrangements, in response to receiving the request, the CSMS 504 may retrieve a CSWL from a database (e.g., CSWL database 510) that includes the digital certificate (e.g., certificate A in FIG. 5) associated with the signed code A and the digital certificate (e.g., certificate B in FIG. 5) with the signed code B and send the CSWL to the client device 512. In some arrangements, the CSMS 504 may generate a digital signature based on the CSWL using a private key associated with the CSMS 504 or a public key associated with the CSMS 504. In some arrangements, the CSMS 504 may attach (e.g., append, pre-pend, link, associate, embed) the digital signature to the CSWL to generate a digitally signed CSWL. In some arrangements, the CSMS 504 may send the digitally signed CSWL to the client device 512. In some arrangements, the CSMS 504 may store the CSWL that it generates in a database (e.g., CSWL database 510). In some arrangements, the CSMS 504 may include one or more Uniform Resource Locators (URL) that refer to remote locations where the client device 512 may fetch the certificates using the one or more URLs.

In some arrangements, the CSMS 504 may generate a cryptographic signature based on a message authentication code (MAC) or a hash-based message authentication code (HMAC). In some arrangements, the CSMS 504 may digitally signing the list of certificates with the digital signature to generate a signed list of certificates. In some arrangements, the digital signature is associated with a time-stamp token (TST) (e.g., X9.95).

The environment 500 includes a CSWL database 510 for storing a plurality of associations between a plurality of code identifiers (shown in FIG. 5 as, "Code ID"), a plurality of certificate locations (shown in FIG. 5 as, "Cert. Location"), a plurality of related code identifiers (shown in FIG. 5 as, "Rel. Code ID"), and/or a plurality of metadata. Each code identifier identifies a code item (e.g., Code A, Code B, etc.) from other code items. Each certificate location is populated with a URL, which indicates the remote location where a computing device (e.g., client device 512) may fetch (e.g., download, etc.) the one or more certificates associated with the corresponding code item. Each related code identifier indicates whether the corresponding code item is associated with (e.g., includes, references) another code item. For example, a first code item (e.g., C425) is associated with second code item (e.g., C228) and a third code item (e.g., C193). Metadata may include any information associated with a digital certificate and/or a code item, such as, a timestamp, a version number, a time-to-live (TTL), and/or the next publication date, etc.

In some arrangements, the CSWL database 510 may include the one or more digital certificates that are associated with each of code items that are identified in the "Code ID" column. As such, the CSMS 504 may generate a CSWL that includes the one or more digital certificates associated with one or more code items. In some arrangement, the CSMS 504 may determine that a code item includes a plurality of code items based on using the CSWL database 510.

Figure 6B:
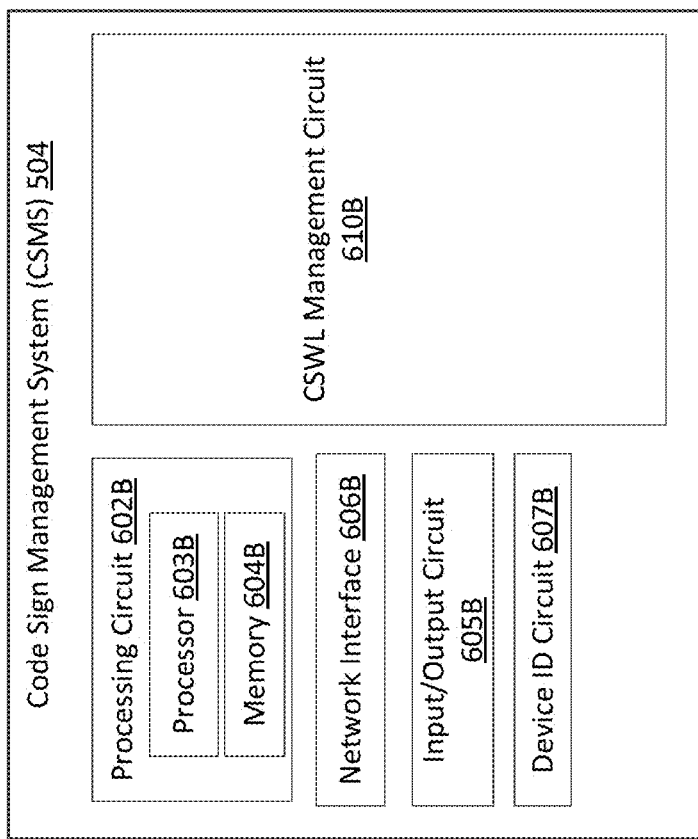
FIG. 6B is a block diagram depicting an example CSMS 504 of the environment in FIG. 5, according to some arrangements
Figure 6A:
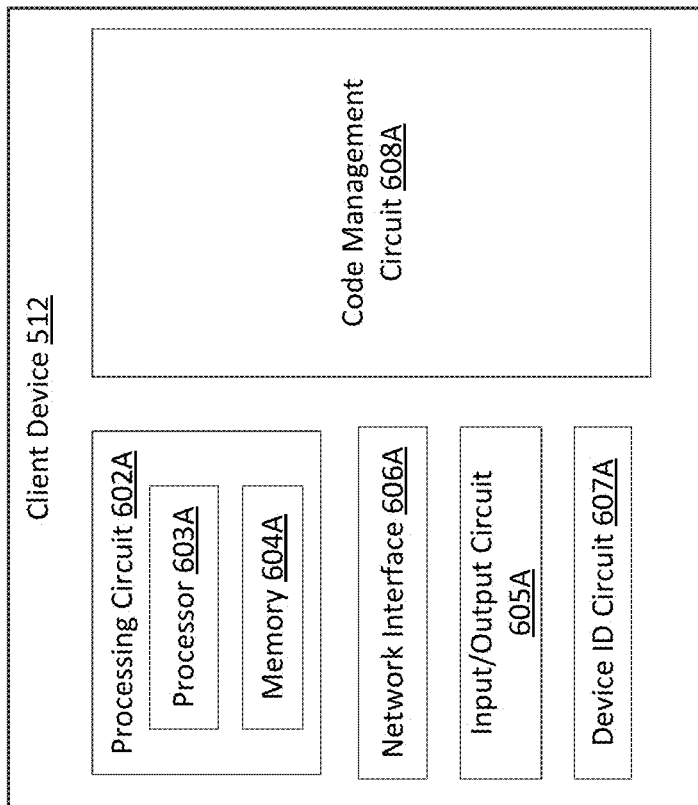
FIG. 6A is a block diagram depicting an example client device 512 of the environment in FIG. 5, according to some arrangements

FIG. 6A is a block diagram depicting an example client device 512 of the environment in FIG. 5, according to some arrangements. While various circuits, interfaces, and logic with particular functionality are shown, it should be understood that the client device 512 includes any number of circuits, interfaces, and logic for facilitating the functions described herein. For example, the activities of multiple circuits may be combined as a single circuit and implemented on a single processing circuit (e.g., processing circuit 602A), as additional circuits with additional functionality are included.

The client device 512 includes a processing circuit 602A composed of one or more processors 603A and a memory 604A. A processor 603A may be implemented as a general-purpose processor, a microprocessor, an Application Specific Integrated Circuit (ASIC), one or more Field Programmable Gate Arrays (FPGAs), a Digital Signal Processor (DSP), a group of processing components, or other suitable electronic processing components. In many arrangements, processor 603A may be a multi-core processor or an array (e.g., one or more) of processors.

The memory 604A (e.g., Random Access Memory (RAM), Read-Only Memory (ROM), Non-volatile RAM (NVRAM), Flash Memory, hard disk storage, optical media, etc.) of processing circuit 602A stores data and/or computer instructions/code for facilitating at least some of the various processes described herein. The memory 604A includes tangible, non-transient volatile memory, or non-volatile memory. The memory 604A stores programming logic (e.g., instructions/code) that, when executed by the processor 603A, controls the operations of the client device 512. In some arrangements, the processor 603A and the memory 604A form various processing circuits described with respect to the client device 512. The instructions include code from any suitable computer programming language such as, but not limited to, C, C++, C#, Java, JavaScript, VBScript, Perl, HTML, XML, Python, TCL, and Basic. In some arrangements (referred to as "headless servers"), the client device 512 may omit the input/output circuit (e.g., input/output circuit 605A), but may communicate with an electronic computing device via a network interface (e.g., network interface 606A).

The client device 512 includes a network interface 606A configured to establish a communication session with a computing device for sending and receiving data over the communication network 520 to the computing device. Accordingly, the network interface 606A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some arrangements, the client device 512 includes a plurality of network interfaces 606A of different types, allowing for connections to a variety of networks, such as local area networks or wide area networks including the Internet, via different sub-networks.

The client device 512 includes an input/output circuit 605A configured to receive user input from and provide information to a user of the client device 512. In this regard, the input/output circuit 605A is structured to exchange data, communications, instructions, etc. with an input/output component of the client device 512. Accordingly, input/output circuit 605A may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the client device 512, such as a built-in display, touch screen, microphone, etc., or external to the housing of the client device 512, such as a monitor connected to the client device 512, a speaker connected to the client device 512, etc., according to various arrangements. In some arrangements, the input/output circuit 605A includes communication circuitry for facilitating the exchange of data, values, messages, and the like between the input/output device and the components of the client device 512. In some arrangements, the input/output circuit 605A includes machine-readable media for facilitating the exchange of information between the input/output device and the components of the client device 512. In still another arrangement, the input/output circuit 605A includes any combination of hardware components (e.g., a touchscreen), communication circuitry, and machine-readable media.

The client device 512 includes a device identification circuit 607A (shown in FIG. 6A as device ID circuit 607A) configured to generate and/or manage a device identifier associated with the client device 512. The device identifier may include any type and form of identification used to distinguish the client device 512 from other computing devices. In some arrangements, a device identifier may be associated with one or more other device identifiers. In some arrangements, to preserve privacy, the device identifier may be cryptographically generated, encrypted, or otherwise obfuscated by any circuit of the client device 512. In some arrangements, the client device 512 may include the device identifier in any communication (any of the messages in FIG. 5, e.g., information request, etc.) that the client device 512 sends to a computing device.

The client device 512 includes a code management circuit 608A that may be configured to send a request (e.g., information request in FIG. 5) to a computing device (e.g., a CSMS 504, another client device 512) for information to verify an authorization of a code item. In some arrangements, the code item may be associated with one or more code items. In some arrangements, the request may include one or more code identifiers to one or more code items.

The code management circuit 608A may be configured to receive one or more messages from a computing device (e.g., a CSMS 504, another client device 512). In some arrangements, the message may include a list of digital certificate associated with one or more code items.

The code management circuit 608A may be configured to extract one or more certificates from the list of certificates, in response to receiving a message that includes the list of certificates. For example, the code management circuit 608A may extract a first certificate from the list of certificates and/or extract a second certificate from the list of certificates. The first certificate may be associated with a first signed code item and/or the second certificate may be associated with a second signed code item. In some arrangements, the code management circuit 608A may, in response to receiving the message, verify the first signed code item using the first certificate and/or verify the second signed code item using the second certificate.

The code management circuit 608A may be configured to extract one or more certificate chains from the list of certificates, in response to receiving a message that includes the list of certificates. For example, the code management circuit 608A may extract a first certificate chain from the list of certificates, where the first certificate chain includes a code-sign certificate, an issuer CA certificate, and/or a root CA certificate.

The code management circuit 608A may be configured to validate the first certificate chain by determining that the certificate chain includes the code-sign certificate, the issuer CA certificate, and/or the root CA certificate.

The code management circuit 608A may be configured to fetch (e.g., download, retrieve) one or more digital certificates that are referenced in a list of certificates. For example, the code management circuit 608A may fetch a first certificate of a list of certificates using a first URL that is included in the list of certificates and/or fetch a second certificate of the list of certificates using a second URL that is included in the list of certificates.

The code management circuit 608A may be configured to verify an authorization of a signed list of certificates. For example, the code management circuit 608A may extract a public key from a digital certificate and verify an authorization of a signed list of certificates using the digital certificate. In some arrangements, the code management circuit 608A may verify an authorization of a signed list of certificates by decrypting a digital signature associated (e.g., attached, linked, appended, etc.) with the list of certificates to recover a hash value. In some arrangements, the code management circuit 608A may hash the list of certificates using a hashing function to generate a second hash value. In some arrangements, the code management circuit 608A may compare the recovered hash value and the second hash value to determine the hash values match.

In some arrangements, if the hash values match, then the code management circuit 608A determines that the signed list of certificates is authentic (e.g., generated by the CSMS 504 and unaltered by a third party). In some arrangements, if the hash values match, then the code management circuit 608A may proceed to verify the one or more code items that are associated with the signed list of certificates. In some arrangements, if the hash values do not match, then the code management circuit 608A determines that the signed list of certificates is not authentic, and determines to not use (e.g., execute, install, run) the one or more code items associated with the signed list of certificates.

The client device 512 includes a bus (not shown), such as an address/data bus or other communication mechanism for communicating information, which interconnects circuits and/or subsystems (e.g., code management circuit 608A, device ID circuit 607A, etc.) of the client device 512. In some arrangements, the client device 512 may include one or more of any such circuits and/or subsystems.

In some arrangements, some or all of the circuits of the client device 512 may be implemented with the processing circuit 602A. For example, any of the client device 512 may be implemented as a software application stored within the memory 604A and executed by the processor 603A. Accordingly, such arrangement can be implemented with minimal or no additional hardware costs. In some arrangements, any of these above-recited circuits rely on dedicated hardware specifically configured for performing operations of the circuit.

FIG. 6B is a block diagram depicting an example CSMS 504 of the environment in FIG. 5, according to some arrangements. While various circuits, interfaces, and logic with particular functionality are shown, it should be understood that the CSMS 504 includes any number of circuits, interfaces, and logic for facilitating the functions described herein. For example, the activities of multiple circuits may be combined as a single circuit and implemented on a single processing circuit (e.g., processing circuit 602A), as additional circuits with additional functionality are included.

The CSMS 504 includes a processing circuit 602B composed of one or more processors 603A and a memory 604B. The processing circuit 602B includes identical or nearly identical functionality as processing circuit 602A in FIG. 6A, but with respect to circuits and/or subsystems of the CSMS 504 instead of circuits and/or subsystems of the client device 512.

The memory 604B (e.g., Random Access Memory (RAM), Read-Only Memory (ROM), Non-volatile RAM (NVRAM), Flash Memory, hard disk storage, optical media, etc.) of processing circuit 602B stores data and/or computer instructions/code for facilitating at least some of the various processes described herein. The memory 604B includes identical or nearly identical functionality as memory 604A in FIG. 6A, but with respect to circuits and/or subsystems of the CSMS 504 instead of circuits and/or subsystems of the client device 512.

The CSMS 504 includes a network interface 606B configured to establish a communication session with a computing device for sending and receiving data over the communication network 520 to the computing device. Accordingly, the network interface 606B includes identical or nearly identical functionality as network interface 606A in FIG. 6A, but with respect to circuits and/or subsystems of CSMS 504 instead of circuits and/or subsystems of the client device 512.

The CSMS 504 includes an input/output circuit 605B configured to receive user input from and provide information to a user. In this regard, the input/output circuit 605B is structured to exchange data, communications, instructions, etc. with an input/output component of the CSMS 504. The input/output circuit 605B includes identical or nearly identical functionality as input/output circuit 605A in FIG. 6A, but with respect to circuits and/or subsystems of the CSMS 504 instead of circuits and/or subsystems of the client device 512.

The CSMS 504 includes a device identification circuit 607B (shown in FIG. 6B as device ID circuit 607B) configured to generate and/or manage a device identifier associated with the CSMS 504. The device ID circuit 607B includes identical or nearly identical functionality as device ID circuit 607A in FIG. 6A, but with respect to circuits and/or subsystems of the CSMS 504 instead of circuits and/or subsystems of the client device 512.

The CSMS 504 includes a CSWL management circuit 608A that may be configured to receive a request (e.g., information request in FIG. 5) from a computing device (e.g., a CSMS 504, another client device 512) for information to verify an authorization of a code item. In response to receiving the request, the CSWL management circuit 608A may generate a list of certificates associated with one or more code items. In some arrangements, the one or more code items may be digitally signed. In some arrangements, the CSWL management circuit 608A may retrieve the one or more digital certificates from a database (e.g., CSWL database 510 in FIG. 5) to generate the list of certificates.

The CSWL management circuit 608A may be configured to transmit a message to a computing device (client device 512 in FIG. 5). In some arrangements, the message may include the list of certificates that the CSWL management circuit 608A generated in response to receiving the request. In some arrangements, the CSWL management circuit 608A configures the message to cause the client device (upon receiving the message) to verify one or more code items that are digitally signed based on the list of certificates that is associated with the one or more code items.

In some arrangements, the CSWL management circuit 608A configures the message to cause the client device (upon receiving the message) to extract one or more certificates from the list of certificates. In some arrangements, the CSWL management circuit 608A configures the message to cause the client device (upon receiving the message) to fetch one or more certificates based on one or more URLs that the CSWL management circuit 609A includes in the list of certificates. In some arrangements, the CSWL management circuit 608A configures the message to cause the client device (upon receiving the message) to extract a public key or a private key associated with the CSMS 504 from a digital certificate.

In some arrangements, the CSWL management circuit 608A configures the message to cause the client device (upon receiving the message) to verify an authorization of the signed list of certificates using a public key or a private key associated with the CSMS 504. For example, the message may cause the client device 512 to extract a public key associated with the one or more processors from a digital certificate, decrypt the digital signature using the public key to recover a hash value, generate a second hash value based on the list of certificates; and compare the hash value and the second hash value The CSWL management circuit 608A may be configured to digitally sign a list of certificates using a private key associated with the CSMS 504 to generate a signed list of certificates. In some arrangements, the CSWL management circuit 608A may digitally sign a list of certificates by generating a digital signature using the private key associated with the one or more processors, and attaching the digital signature to the list of certificates to generate the signed list of certificates.

The CSWL management circuit 608A may be configured to receive one or more digital certificates from one or more developers and update a database. For example, the CSWL management circuit 608A may receive, from a first code developer, a first identifier to a first certificate associated with a first signed code segment. The CSWL management circuit 608A may receive, from a second code developer, a second identifier to a second certificate associated with a second signed code segment. The CSWL management circuit 608A may update a database (e.g., CSWL database 510) based on the first identifier and the second identifier.

The CSWL management circuit 608A may be configured to determine that a code bundle is associated with one or more code segments. For example, the CSWL management circuit 608A may receive a request from a client device 512 for information to verify an authorization of a code bundle (e.g., C425 in FIG. 5) that includes a first "signed" code segment (e.g., C228 in FIG. 5) and a second "signed" code segment (e.g., C193 in FIG. 5). The CSWL management circuit 608A may compare the code bundle to a database (e.g., CSWL database 510) to determine that the code bundle includes the first "signed" code segment and the second "signed" code segment. In response, the CSWL management circuit 608A may retrieve the one or more digital certificates associated with the first "signed" code segment and the first "signed" code segment from the database, and include the retrieved digital certificates in the list of certificates.

In some arrangements, a code segment may be a portion of object code, a portion of source code, a portion of assembly code, a portion of machine code, a portion of executable code, a portion of interpretable code, or a corresponding section of a program's (e.g., the code bundle) virtual address space that contains executable instructions.

The CSWL management circuit 608A may be configured to generate a pair of public and private keys.

The CSWL management circuit 608A may be configured to provide a public key (e.g., "public key C" in FIG. 5) and/or identifying information (e.g., the CSMS's 504 identity information, the certificate authority's 506C identity information) to a certificate authority (e.g., certificate authority 506C). In response, the certificate authority 506C may generate a digital certificate (e.g., "certificate C" in FIG. 5) that includes the public key and/or identifying information, and provide the digital certificate to the CSMS 504.

The CSMS 504 includes a bus (not shown), such as an address/data bus or other communication mechanism for communicating information, which interconnects circuits and/or subsystems (e.g., CSWL management circuit 610B, etc.) of the CSMS 504. In some arrangements, the CSMS 504 may include one or more of any such circuits and/or subsystems.

In some arrangements, some or all of the circuits of the CSMS 504 may be implemented with the processing circuit 602B. For example, any of the CSMS 504 may be implemented as a software application stored within the memory 604B and executed by the processor 603B. Accordingly, such arrangement can be implemented with minimal or no additional hardware costs. In some arrangements, any of these above-recited circuits rely on dedicated hardware specifically configured for performing operations of the circuit.

FIG. 7 is a flow diagram depicting a method for efficiently managing an executable environment involving multiple code-sign certificate chains, according to some arrangements. Additional, fewer, or different operations may be performed in the method depending on the particular arrangement. In some arrangements, some or all operations of method 700 may be performed by one or more processors executing on one or more computing devices, systems, or servers. In some arrangements, method 700 may be performed by one or more code sign management systems, such as CSMS 504 in FIG. 5. In some arrangements, method 700 may be performed by one or more client devices, such as client device 512 in FIG. 5. Each operation may be re-ordered, added, removed, or repeated.

As shown in FIG. 7, the method 700 includes the operation 702 of receiving, by one or more processors and from a client device, a request for information to verify an authorization of a code item, the code item associated with a first signed code segment and a second signed code segment. In some arrangements, the method includes the operation 704 of generating, by one or more processors, a list of certificates associated with the code item. In some arrangements, the method includes the operation 706 of transmitting, by the one or more processors and to the client device, a message comprising the list of certificates. In some arrangements, the message causes the client device to verify the code item based on the list of certificates.

FIG. 8 is a flow diagram depicting a method for efficiently managing an executable environment involving multiple code-sign certificate chains, according to some arrangements. Additional, fewer, or different operations may be performed in the method depending on the particular arrangement. In some arrangements, some or all operations of method 800 may be performed by one or more processors executing on one or more computing devices, systems, or servers. In some arrangements, method 800 may be performed by one or more code sign management systems, such as CSMS 504 in FIG. 5. In some arrangements, method 800 may be performed by one or more client devices, such as client device 512 in FIG. 5. Each operation may be reordered, added, removed, or repeated.

As shown in FIG. 8, the method 800 includes the operation 802 of transmitting, by a client device and to one or more processor, a request for information to verify an authorization of a code item comprising a first signed code segment and a second signed code segment, the request causing the one or more processors to generate a list of certificates associated with the code item. In some arrangements, the method includes the operation 804 of receiving, by the client device and from the one or more processors, a message comprising the list of certificates. In some arrangements, the method includes the operation 806 of verifying the code item based on the list of certificates.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution.

Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Litecoin, Dogecoin, and the like.

It should be noted that although the diagrams herein may show a specific order and composition of method blocks, it is understood that the order of these blocks may differ from what is depicted. For example, two or more blocks may be performed concurrently or with partial concurrence. Also, some method blocks that are performed as discrete blocks may be combined, blocks being performed as a combined block may be separated into discrete blocks, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching blocks, correlation blocks, comparison blocks and decision blocks.

It is also understood that any reference to an element herein using a designation such as "first," "second," and so forth does not generally limit the quantity or order of those elements. Rather, these designations can be used herein as, a convenient means of distinguishing between two or more elements or instances of an element. Thus, a reference to first and second elements does not mean that only two elements can be employed, or that the first element must precede the second element in some manner.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:
   receiving, by one or more processors, a list of certificates associated with a code bundle, the code bundle comprising a first signed code segment and a second signed code segment;
   generating, by the one or more processors, a signed list of certificates based on digitally signing the list of certificates with a digital signature and attaching the digital signature to the list of certificates, wherein digitally signing comprises hashing the first signed code segment and encrypting the first signed code segment with a first private key associated with a first developer, and wherein digitally signing further comprises hashing the second signed code segment and encrypting the second signed code segment with a second private key associated with a second developer; and
   transmitting, by the one or more processors and to a client device, a message comprising the signed list of certificates, the message causing the client device to verify at least one of the first signed code segment and the second signed code segment of the signed list of certificates, wherein verifying comprises extracting a public key from the signed list of certificates and authenticating a first hash value of the code bundle with a second hash value generated by the client device based on the list of certificates.

2. The method of claim 1, wherein the message further causes the client device to extract a public key associated with the one or more processors from the signed list of certificates and verify an authentication of the signed list of certificates.

3. The method of claim 1, wherein the message causes the client device to verify the digital signature on the code bundle, and wherein the digital signature is separate from the signed list of certificates.

4. The method of claim 1, further comprises:
   hashing, by the one or more processors, the code bundle using a hash function to generate a hash value of the code bundle.

5. The method of claim 4, wherein verifying the code bundle based on the signed list of certificates comprises generating a second hash value based on the signed list of certificates and comparing the hash value and the second hash value.

6. The method of claim 1, wherein the digital signature is generated based on a message authentication code (MAC) or a hash-based message authentication code (HMAC), and wherein the digital signature is associated with a time-stamp token (TST).

7. The method of claim 1, further comprising:
   receiving, by the one or more processors and from the first developer, a first identifier to a first certificate associated with the first signed code segment;
   receiving, by the one or more processors and from the second developer, a second identifier to a second certificate associated with the second signed code segment; and
   updating, by the one or more processors, a database based on the first identifier and the second identifier.

8. A system comprising:
   one or more processors; and
   one or more non-transitory computer-readable storage mediums storing instructions which, when executed by the one or more processors, cause the one or more processors to:
      receive a list of certificates associated with a code bundle, the code bundle associated with a first signed code segment and a second signed code segment;
      generate a signed list of certificates based on digitally signing the list of certificates with a digital signature and attaching the digital signature to the list of certificates, wherein digitally signing comprises hashing the first signed code segment and encrypting the first signed code segment with a first private key associated with a first developer, and wherein digitally signing further comprises hashing the second signed code segment and encrypting the second signed code segment with a second private key associated with a second developer;
      transmit, to a client device, a message comprising the signed list of certificates, the message causing the client device to verify at least one of the first signed code segment and the second signed code segment of the signed list of certificates, wherein verifying comprises extracting a public key from the signed list of certificates and authenticating a first hash value of the code bundle with a second hash value generated by the client device based on the list of certificates.

9. The system of claim 8, wherein the message further causes the client device to extract a public key associated with the one or more processors from the signed list of certificates and verify an authentication of the signed list of certificates.

10. The system of claim 8, wherein the message causes the client device to verify the digital signature on the code bundle, and wherein the digital signature is separate from the signed list of certificates.

11. The system of claim 8, the one or more processors; and
the one or more non-transitory computer-readable storage mediums storing instructions which, when executed by the one or more processors, further cause the one or more processors to:
hash the code bundle using a hash function to generate a hash value of the code bundle.

12. The system of claim 11, wherein verifying the code bundle based on the signed list of certificates comprises generating a second hash value based on the signed list of certificates and comparing the hash value and the second hash value.

13. The system of claim 8, wherein the digital signature is generated based on a message authentication code (MAC) or a hash-based message authentication code (HMAC), and wherein the digital signature is associated with a time-stamp token (TST).

14. The system of claim 8, wherein the message causes the client device to extract a first certificate from the signed list of certificates and extract a second certificate from the signed list of certificates, wherein the first certificate is associated with the first signed code segment and the second certificate is associated with the second signed code segment.

15. The system of claim 14, wherein the message causes the client device to verify the first signed code segment using the first certificate and verify the second signed code segment using the second certificate.

16. The system of claim 8, wherein the message causes the client device to extract a first certificate chain from the signed list of certificates, wherein the first certificate chain includes a code-sign certificate, an issuer CA certificate, and a root CA certificate.

17. The method of claim 8, wherein the message causes the client device to fetch a first certificate of the signed list of certificates using a first URL included in the signed list of certificates, and fetch a second certificate of the signed list of certificates using a second URL included in the signed list of certificates.

18. A non-transitory computer-readable storage medium storing instructions which, when executed by one or more processors, cause the one or more processors to perform operations comprising:
receiving, by the one or more processors, a list of certificates associated with a code bundle, the code bundle associated with a first signed code segment and a second signed code segment;
generating, by the one or more processors, a signed list of certificates based on digitally signing the list of certificates with a digital signature and attaching the digital signature to the list of certificates, wherein digitally signing comprises hashing the first signed code segment and encrypting the first signed code segment with a first private key associated with a first developer, and wherein digitally signing further comprises hashing the second signed code segment and encrypting the second signed code segment with a second private key associated with a second developer;
transmitting, by the one or more processors and to a client device, a message comprising the signed list of certificates, the message causing the client device to verify at least one of the first signed code segment and the second signed code segment of the signed list of certificates, wherein verifying comprises extracting a public key from the signed list of certificates and authenticating a first hash value of the code bundle with a second hash value generated by the client device based on the list of certificates.

\* \* \* \* \*